US006757465B1

United States Patent
Yokokawa et al.

(10) Patent No.: US 6,757,465 B1
(45) Date of Patent: Jun. 29, 2004

(54) OPTICAL FIBER CABLE AND METHOD OF PRODUCING THE SAME

(75) Inventors: Tomoyuki Yokokawa, Yokohama (JP); Hideyuki Iwata, Mito (JP)

(73) Assignees: Sumitomo Electric Industries, Ltd., Osaka (JP); Nippon Telegraph and Telephone Corporation, Tokyo (JP)

( * ) Notice: Subject to any disclaimer, the term of this patent is extended or adjusted under 35 U.S.C. 154(b) by 441 days.

(21) Appl. No.: 09/632,160

(22) Filed: Aug. 3, 2000

(30) Foreign Application Priority Data

Aug. 23, 1999 (JP) .......................................... 11-234866

(51) Int. Cl.[7] .................................................. G02B 6/44
(52) U.S. Cl. ....................................................... 385/113
(58) Field of Search ................................ 385/113, 112, 385/100

(56) References Cited

U.S. PATENT DOCUMENTS 5,016,973 A * 5/1991 Hager et al. ................ 385/102
6,236,790 B1 * 5/2001 Okada et al. ............... 385/102
6,253,012 B1 * 6/2001 Keller et al. ............... 385/109

FOREIGN PATENT DOCUMENTS

JP 9-166733 6/1997

* cited by examiner

Primary Examiner—Javaid H. Nasri
(74) Attorney, Agent, or Firm—McDermott, Will & Emery

(57) ABSTRACT

An optical fiber cable produced at low cost is provided, in which an optical fiber core covered with an outer covering is suppressed from moving inside the outer covering in the lengthwise direction thereof and which does not cause the transmission characteristics to be deteriorated even when the cable is bent. In the optical fiber cable, buffer members composed of a long fiber are longitudinally disposed or stranded around at least one optical fiber core, the buffer members and the optical fiber core are adhered together intermittently in the lengthwise direction, and an outer covering is provided to surround the buffer members.

8 Claims, 3 Drawing Sheets

OPTICAL FIBER CABLE AND METHOD OF PRODUCING THE SAME

BACKGROUND OF THE INVENTION

1. Field of the Invention

The present invention relates to a low cost optical fiber cable in which an optical fiber core having an outer covering is suppressed from movement inside the outer covering in the lengthwise direction thereof and which does not cause deterioration of the transmission characteristics even when the cable is bent, and to a method of producing the same.

2. Description of the Related Art

An optical fiber core is accompanied by a problem in that the transmission characteristics are deteriorated or the life is shortened when a tension larger than a predetermined value is applied thereonto. Therefore, an optical fiber cable accommodating the optical fiber core has been contrived so that a large tension will not act on the optical fiber core even when the optical fiber cable is laid, even when the optical fiber cable receives a stress due to wind pressure after the cable has been laid, or even when the optical fiber cable expands or contracts due to a change in the environmental temperature.

Usually, the optical fiber core covered with an outer covering has an excess length slightly larger than the length of the cable, so that no tension is applied onto the optical fiber core even when the optical fiber cable is expanded by the application of tension, provided the expansion is within the amount of the excess length.

Further, when the optical fiber cable is left to be laid for extended periods of time, the optical fiber cable receives vibration or undergoes expansion or contraction due to a change in the environmental temperature, whereby the optical fiber core moves in the cable in the lengthwise direction, the optical fiber core inside the cable protrudes beyond the end of the outer covering of the optical fiber cable, or the optical fiber core draws back into the outer covering.

For the purpose of preventing such phenomenon, in order that the optical fiber core will not freely move in the lengthwise direction in the outer covering, application of a jelly blend to the periphery of the optical fiber core has been attempted to increase the friction and allow only minimal movement of the optical fiber core. Or, it has been attempted to fix the optical fiber core to the outer covering so that the optical fiber core will not move at the end or inside of the optical fiber cable.

An example of the optical fiber cable according to the above related art has been disclosed in Japanese Laid-Open Patent No. 166733/1997. FIG. 3 is a view illustrating the above optical fiber cable, wherein FIG. 3A is a vertical cross-sectional view thereof, and FIG. 3B is a lateral cross-sectional view thereof as viewed in the X-direction. In FIG. 3, further, reference numeral 16 denotes an optical fiber core, 17 denotes tension members, 18 denotes an accommodating member, 19 denotes movement-suppressing members, 20 denotes core wrap tapes, and reference numeral 21 denotes an outer covering. The names of the portions denoted by reference numerals comply with the terms used in this invention.

In this optical fiber cable, a plurality of optical fiber ribbons 16 are accommodated having an excess length in a slackened manner in a groove, which is in a U-shape in cross section, of the accommodating member 18 in which two tension members 17 are buried in the lengthwise direction, and the movement-suppressing member 19 composed of an adhesive or the like is provided so as to fill the surrounding of the optical fiber cores 16 in the groove of the accommodating member 18 intermittently in the lengthwise direction to secure the optical fiber cores 16 to the accommodating member 18. The accommodating member 18 is surrounded by the core wrap tapes 20 and the outer covering 21 to obtain an optical fiber cable.

In the optical fiber cable shown in FIG. 3, the optical fiber cores 16 are secured to the accommodating member 18 by the movement-suppressing member 19 composed of an adhesive or the like intermittently in the lengthwise direction. Therefore, the protrusion of the optical fiber cores 16 beyond the end of the outer covering 21 at the end of the optical fiber cable, or drawing back from the end of the outer covering 21 does not occur.

However, since the optical fiber cores 16 are secured to the hard accommodating member 18 by the movement-suppressing members 19 intermittently, when the optical fiber cable is bent at a small radius of curvature, an excessive tensile force is applied onto the optical fiber cores 16 near the movement-suppressing members 19, and a transmission loss of the optical fiber cores often increases by 0.1 dB or more.

If the optical fiber cores are not secured by the movement-suppressing members, the transmission loss of the optical fiber cores does not increase even when the optical fiber cable is bent at a small radius of curvature. However, the optical fiber cores are no longer suppressed from freely moving in the accommodation member in the lengthwise direction. Therefore, when an extended period of time passes from the laying, the optical fiber cores move in the accommodating member in the lengthwise direction as a result of expansion and contraction of the cable due to a change in the environmental temperature and vibration caused by wind pressure, etc. Consequently, the optical fiber cores protrude beyond the end of the outer covering at an end of the optical fiber cable, or draw back from the end of the outer covering.

In addition, the optical fiber cable shown in FIG. 3 is expensive since it uses the custom made accommodating member having a U-shaped groove.

SUMMARY OF THE INVENTION

This invention is aimed to provide an optical fiber cable at a reduced cost and a method of producing the same, without deteriorating the transmission characteristics even when the optical fiber cable is bent.

The optical fiber cable of this invention features buffer members composed of a long fiber longitudinally provided or stranded around at least one optical fiber core, and said buffer members and said optical fiber core are adhered together intermittently in the lengthwise direction, and an outer covering is provided to surround buffer members.

According to the optical fiber cable of the invention, the optical fiber core is suppressed from moving in the cable, and the transmission loss does not increase even when the cable is bent.

That is, in the optical fiber cable of this invention, buffer members are longitudinally disposed or stranded around the optical fiber core, buffer members and the optical fiber core are adhered together intermittently in the lengthwise direction, and an outer covering is provided to surround the buffer member. Therefore, even when the cable is expanded or contracted due to vibration caused by wind pressure, etc. or due to a change in the environmental temperature, after the cable is laid, the optical fiber core does not move in the lengthwise direction of the cable, and does not protrude beyond the end of the outer covering or does not draw back from the end of the outer covering.

Further, buffer members and the outer covering are also adhered together intermittently in the lengthwise direction to enhance the effect for suppressing the movement of the optical fiber core.

Further, in the optical fiber cable of the invention, the optical fiber core is protected by a material having a low bulk density, i.e., by buffer members comprising a long fiber. Therefore, even when the cable is bent, the bending stress is not transmitted to the optical fiber core, and the transmission loss of the optical fiber core does not increase even when the cable is bent.

In addition, owing to buffer members, the optical fiber cores are not damaged even when peeling off the outer covering for branching the cores. Accordingly, the operation can be conducted without any anxiety. Further, buffer members are cheaper than the accommodating member that is used in the related art, and the cost of the cable can be lowered.

According to this invention, the optical fiber cable is produced by applying an adhesive onto at least one optical fiber core intermittently in the lengthwise direction thereof, longitudinally disposing or stranding buffer members composed of a long fiber thereabout, and providing an outer covering to surround buffer members.

Further, according to this invention, the optical fiber cable is produced by longitudinally disposing or stranding buffer members composed of a long fiber around at least one optical fiber core, dropping an adhesive onto the surface of buffer members intermittently in the lengthwise direction so as to exude into the peripheries of the optical fiber cores passing through the gaps in buffer members, and providing an outer covering to surround buffer members.

To adhere buffer members and the outer covering intermittently in the lengthwise direction, the adhesive applied onto the optical fiber core is caused to exude out to the surface of buffer members passing through the gaps in buffer members, or the adhesive is applied onto the surface of buffer members to establish a state where the adhesive is applied onto the surface of buffer members intermittently in the lengthwise direction, and the outer covering is provided thereon in a state where the adhesive has not yet been cured, so that the fiber core and buffer members are adhered together and that the outer covering and buffer members are adhered together intermittently in the lengthwise direction.

BRIEF DESCRIPTION OF THE DRAWINGS

FIG. 1 is a view illustrating an embodiment of an optical fiber cable according to the invention, wherein

FIG. 2 is a view illustrating an embodiment of when the invention is applied onto a self-supported optical fiber cable, wherein FIG. 3 is a view illustrating an optical fiber cable according to the related art, wherein

DESCRIPTION OF THE PREFERRED EMBODIMENTS

Figure 1A:
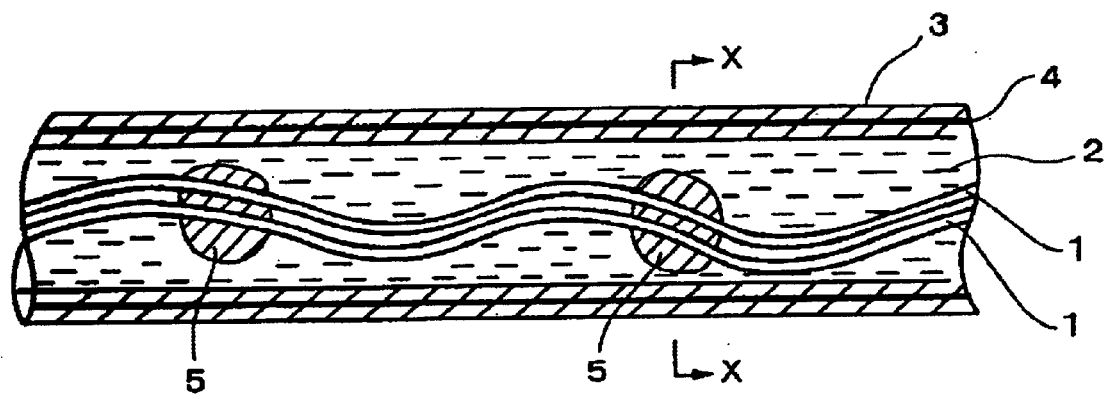
FIG. 1A is a vertical cross-sectional view thereof.
Figure 1B:
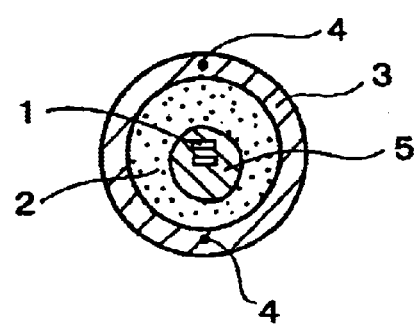
FIG. 1B is a lateral cross-sectional view thereof as viewed in the X-direction.

FIG. 1 is a view illustrating an embodiment of an optical fiber cable of the invention, wherein FIG. 1A is a vertical cross-sectional view thereof, and FIG. 1B is a lateral cross-sectional view thereof in the X-direction. In FIG. 1, reference numeral 1 denotes optical fiber cores, 2 denotes buffer members, 3 denotes an outer covering, 4 denotes steel wires, and reference numeral 5 denotes an adhered portion.

The optical fiber core 1 may be a single optical fiber core obtained by coating an optical fiber made of, e.g., quartz glass with a resin, or a fiber ribbon obtained by arranging a plurality of fiber cores in parallel which are coated together with a resin, or a bundle which are stranded with optical fiber cores, or a stack composed of fiber ribbons.

The buffer member 2 composed of a long fiber is stranded or longitudinally disposed around the optical fiber core 1 so as to cover the optical fiber core 1 thereby forming a cable core. The buffer member 2 composed of a long fiber desirably has a Young's modulus of from several tens $kg/mm^2$ to a hundred and several tens $kg/mm^2$, and a polyproylene yarn, a polyethylene terephthalate yarn, or a similar synthetic yarn can be desirably used. Thus, a layer of a soft buffer member having a bulk density of from about 0.2 $g/cm^3$ to about 0.3 $g/cm^3$ containing a large quantity of air is formed to surround the optical fiber core. The surface of the buffer member may be covered with coarsely winding yarns.

The contact portions between the optical fiber core 1 and the buffer member 2 are adhered together with an adhesive intermittently in the lengthwise direction thereby forming adhered portions 5. The distance between the adhered portions 5 is from several tens centimeters to several meters. Desirably, the adhesive is not one that becomes too hard after curing but may be one that is cured while maintaining a degree of elasticity, and a one-pack type silicone resin adhesive or a similar adhesive can be used. As an adhesive, urethane acrylate adhesive, or synthetic rubber adhesive also can be used.

The adhesive is dropped on the surface of the optical fiber core in an amount of about 0.5 milliliters per adhered portion, and the buffer member is placed thereon and left to stand for several minutes. Then, the adhesive cures to form the adhered portions 5. The outer covering may be provided before the adhesive cures, and the cable may be left to stand until the adhesive cures. When many optical fiber cores are bundled, only those optical fiber cores on the surface of the bundle of the optical fiber cores need be adhered to the buffer member, i.e., all of the optical fiber cores need not be adhered.

A plastic material is extruded by an extruder onto the cable core obtained by disposing the buffer member 2 about the optical fiber core 1 to form the outer covering 3.

Polyolefin, polyvinyl chloride, thermoplastic resin or a similar resin which is used usually as a cable sheath, can be used as a plastic material. The outer covering 3 formed by the extrusion slightly shrinks in the lengthwise direction after extruding, and the length of the cable core does not change.

Therefore, the cable core is accommodated in the outer covering 3 in an excess amount corresponding to the shrinkage, i.e., the optical fiber core accommodated in the outer covering 3 possesses an excess length larger by about 0.05%, compared with the outer covering.

About two steel wires 4 having a diameter of about 0.5 mm to about 0.8 mm may be buried in the outer covering 3 to suppress the shrinkage of the plastic material in the lengthwise direction. However, the steel wires 4 may not be buried. Further, the outer covering 3 may be a laminate of an aluminum foil and a plastic material.

The optical fiber cable shown in FIG. 1 comprises the optical fiber core and the buffer member composed of a long fiber adhered together with an adhesive intermittently in the lengthwise direction. Therefore, movement of the optical fiber core is suppressed by the fiber member irrespective of a change in the environmental temperature, or vibration due to wind pressure, etc., and, hence, there is on significant movement of the optical fiber core in the lengthwise direction of the cable. Even when the optical fiber cores are in the form of a bundle and only those optical fiber cores on the surfaces are adhered, the bundle of the optical fiber cores is suppressed from moving in the lengthwise direction. Thus, the effect for suppressing movement can be expected to a sufficient degree.

Since the buffer member has a low bulk density and slightly slides in the lengthwise direction of the cable or in the radial direction of the cable, no large tensile force is applied onto the optical fiber core, even when the optical fiber cable is bent. Accordingly, the transmission loss of the optical fiber core does not increase even when the optical fiber cable is bent.

Figure 2A:
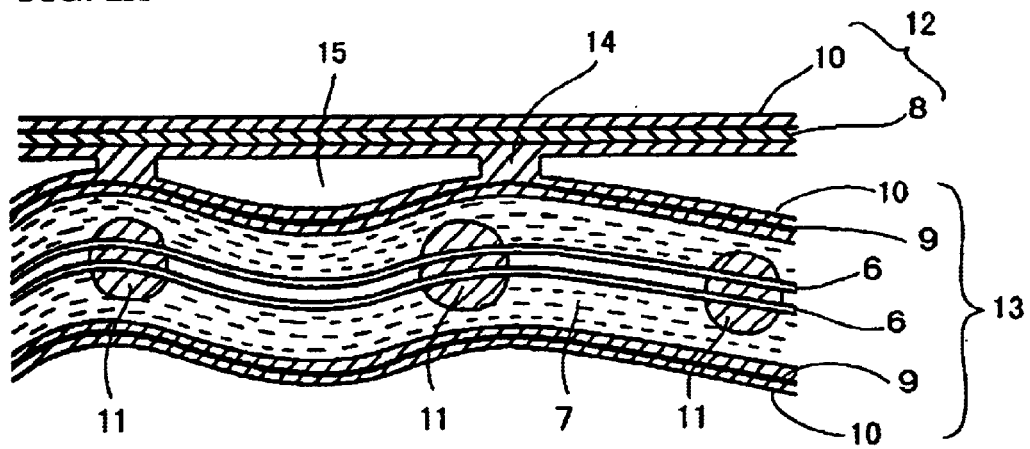
FIG. 2A is a vertical cross-sectional view thereof.
Figure 2B:
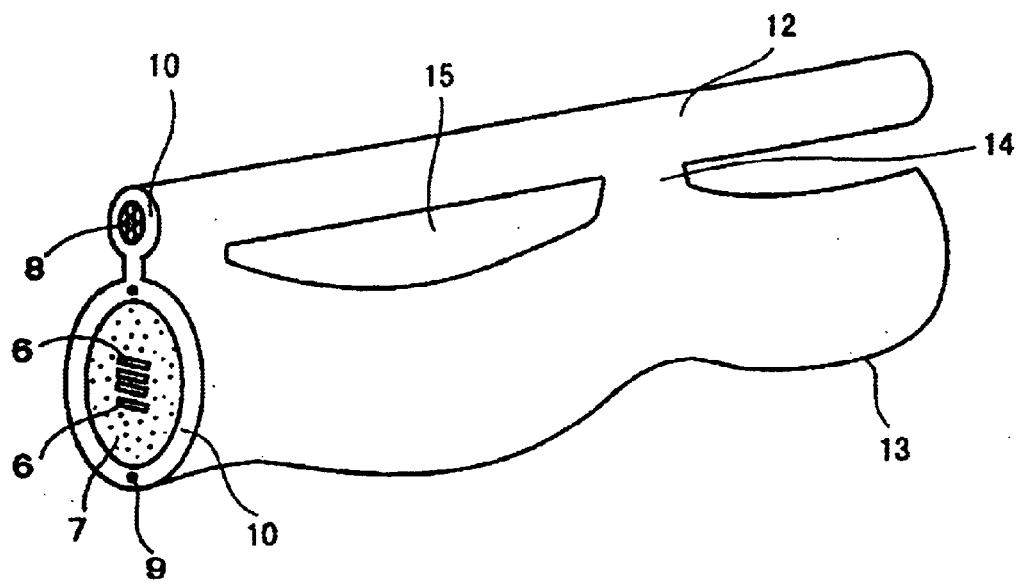
FIG. 2B is a perspective view thereof.
Figure 3A:
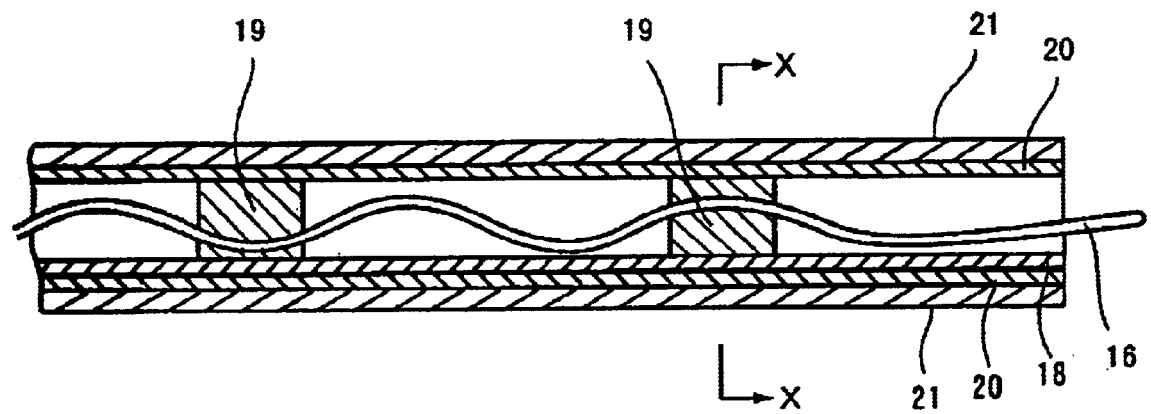
FIG. 3A is a vertical cross-sectional view thereof.
Figure 3B:
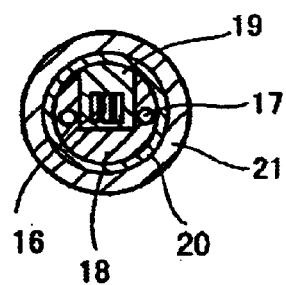
FIG. 3B is a lateral cross-sectional view thereof as viewed in the X-direction.

FIG. 2 is a diagram illustrating an embodiment of when the invention is applied onto a self-supported optical fiber cable, wherein FIG. 2A is a vertical cross-sectional view thereof, and FIG. 2B is a perspective view thereof. In FIG. 2, reference numeral 6 denotes optical fiber cores, 7 denotes a buffer member, 8 denotes a support wire, 9 denotes steel wires, 10 denotes an outer covering, 11 denotes adhered portions, 12 denotes a support wire portion, 13 denotes a cable body, 14 denotes neck portions, and reference numeral 15 denotes window portions.

In the self-supported optical fiber cable of FIG. 2, the buffer member 7 is stranded or longitudinally disposed about the optical fiber cores 6, and the optical fiber cores 6 and the buffer member 7 are adhered together intermittently in the lengthwise direction to form adhered portions 11, thereby forming a cable core in the same manner as that of the optical fiber cable of FIG. 1.

In the case of the self-supported optical fiber cable of FIG. 2, the cable cores and the support wire 8 are arranged in parallel, and the outer covering 10 made of a plastic material is extruded to surround them. The support wire 8 comprises steel wires, steel strands or FRP. The portion where the outer covering is provided for the support wire 8 is a support wire portion, the portion where outer covering is provided for the cable cores is a cable body 13, the support wire portion 12 and the cable body 13 are coupled together intermittently in the lengthwise direction, and a portion without the neck portion 14 forms the window 15 between the support wire portion 12 and the cable body 13.

The length of the cable body 13 is about 0.25% longer than the length of the support wire portion 12. Further, the optical fiber cores 6 accommodated in the cable body 13 have an excess length about 0.05% longer than the length of the cable body 13. The length of the cable body 13 is made to be longer than the length of the support wire portion 12, so that the cable body will not expand even when the cable is expanded by tension at the time when the cable is strung and that the operation is facilitated for branching some of the optical fiber cores in the cable body without cutting the cable.

In the optical fiber cables of FIGS. 1 and 2, though not diagramed, the buffer member and the outer covering are adhered together intermittently in the lengthwise direction in order to enhance the effect of suppressing the movement of the optical fiber cores in the outer covering in the lengthwise direction thereof. The adhesive applied onto the optical fiber cores is exuded out to the surface of the buffer member passing through the gaps in the buffer members or the adhesive is applied onto the surface of the buffer member, and the outer covering is provided before the adhesive is cured, in order to adhere the buffer member and the outer covering together intermittently in the lengthwise direction.

By using a heat-fusible material as at least part of the buffer member and extruding the thermoplastic resin to form the outer covering, the buffer member and the outer covering can be adhered together over nearly the entire length thereof due to the heat at the time of extrusion. In this case, too, the buffer member is adhered at the surface only, the buffering effect is not impaired and the cable is not adversely affected even when it is bent.

EXAMPLE

The self-supported optical fiber cable of the structure shown in FIG. 2 was produced under the following conditions. Seven stranded aluminum-zinc-plated steel wires each having a diameter of 1.4 mm were used as a support wire, and a stack of ten optical fiber ribbons (about 0.31 mm thick and about 1.1 mm wide) each having 4 optical fibers was used as an optical fiber core. Polypropylene yarns of 42,000 deniers were used as the buffer member. When the buffer member was disposed around the optical fiber core, the outer diameter was about 5 mm.

The adhered portions were formed by dropping a one-pack type silicone adhesive onto the stack of optical fiber ribbons in an amount of 0.5 milliliters per point maintaining an interval of 5 meters of the cable. The outer covering was extruded with polyethylene. Two steel wires having a diameter of 0.72 mm were buried in the outer covering. The cable body possessed an outer diameter of about 8 mm, and the support wire portion possessed an outer diameter of about 6 mm. The neck portions were formed maintaining an interval of 500 mm and each neck portion possessed a length of about 50 mm in the lengthwise direction of the cable. The optical fiber core possessed an excess length of about 0.05% relative to the length of the cable body, and the length of the cable body was about 0.25% longer than the length of the support wire.

The following test was conducted by using the self-supported optical fiber cable produced under the above-mentioned conditions. The optical fiber cable having a length of 50 m was strung, and a vibrator was installed at a position 10 m away from an end. The optical fiber cable was vibrated one million times maintaining an amplitude of 15 cm at a frequency of 3 Hz to examine the movement of the optical fiber core at the end of the optical fiber cable in the lengthwise direction. The amount of movement was not larger than 5 mm, which was a favorable result.

Further, the optical fiber cable was wound on the mandrels of diameters of 320 mm and 160 mm so as to be bent, to examine an increase in the transmission loss of the optical fiber core. As a result, the increase in the transmission loss was not larger than 0.01 dB, which was practicable to a sufficient degree. Further, the outer covering of the cable body was peeled away over a length of 40 cm for taking out the optical fiber cores. The optical fiber cores were not damaged by the tearing open of the outer covering, and the operation could be conducted without any anxiety.

What is claimed is:

1. An optical fiber cable, wherein buffer members composed of a long fiber is longitudinally disposed or stranded around at least one optical fiber core, said buffer members and said optical fiber core are adhered together intermittently in the lengthwise direction, and an outer covering is provided to surround said buffer members.

2. The optical fiber cable according to claim 1, wherein said buffer members and said outer covering surrounding said buffer members are adhered together intermittently in the lengthwise direction.

3. An optical fiber cable, wherein buffer members composed of synthetic yarns is longitudinally disposed or stranded around at least one optical fiber core, said buffer members and said optical fiber core are adhered together intermittently in the lengthwise direction, and an outer covering is provided to surround said buffer members.

4. The optical fiber cable according to claim 3, wherein said buffer members and said outer covering surrounding said buffer members are adhered together intermittently in the lengthwise direction.

5. A method of producing an optical fiber cable comprising applying an adhesive onto at least one optical fiber core intermittently in the lengthwise direction thereof, longitudinally disposing or stranding a buffer member of a long fiber thereabout so that the buffer members are adhered intermittently to the at least one optical fiber core, and providing an outer covering to surround said buffer members.

6. A method of producing an optical fiber cable comprising longitudinally disposing or stranding a buffer members of a long fiber around at least one optical fiber core, dropping an adhesive on said buffer members intermittently in the lengthwise direction so that said adhesive exudes into the periphery of said optical fiber passing through gaps in said buffer members, and providing an outer covering to surround said buffer members.

7. A method of producing an optical fiber cable comprising applying an adhesive onto at least one optical fiber core intermittently in the lengthwise direction, and longitudinally disposing or stranding a buffer members composed of a long fiber thereabout so that the adhesive applied onto said optical fiber core exudes out to the surface of the buffer members passing through the gaps of the buffer members, or longitudinally disposing or stranding the buffer members of the long fiber around the optical fiber core and applying the adhesive onto said buffer members intermittently in the lengthwise direction to establish a state where the adhesive is applied onto the surface of the buffer members intermittently in the lengthwise direction, and providing an outer covering to surround them while the adhesive has not been cured in order to adhere said optical fiber core and said buffer members together and to adhere said outer covering and said buffer members together intermittently in the lengthwise direction.

8. A method of producing an optical fiber cable comprising longitudinally disposing or stranding a buffer members of a long fiber about at least one optical fiber core, adhering said buffer members and said optical fiber together intermittently in the lengthwise direction, and providing an outer covering to surround said buffer members, wherein a heat-fusible material is used at least as part of said buffer members, said outer covering is provided by extruding a thermoplastic resin, and said buffer members and said outer covering are adhered together using the heat at the time of extrusion.

* * * * *